(12) United States Patent
Hastings et al.

(10) Patent No.: US 10,346,348 B2
(45) Date of Patent: *Jul. 9, 2019

(54) QUANTUM COMPUTING METHODS AND DEVICES FOR MAJORANA TETRON QUBITS

(71) Applicant: Microsoft Technology Licensing, LLC, Redmond, WA (US)

(72) Inventors: Matthew Hastings, Seattle, WA (US); Torsten Karzig, Goleta, CA (US); Parsa Bonderson, Santa Barbara, CA (US); Michael Freedman, Santa Barbara, CA (US); Roman Lutchyn, Santa Barbara, CA (US); Chetan Nayak, Santa Barbara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/636,457

(22) Filed: Jun. 28, 2017

(65) Prior Publication Data
US 2018/0052806 A1 Feb. 22, 2018

Related U.S. Application Data (63) Continuation-in-part of application No. 15/636,376, filed on Jun. 28, 2017, and a continuation-in-part of application No. 15/634,983, filed on Jun. 27, 2017.
(Continued)

(51) Int. Cl.
*G01N 7/02* (2006.01)
*G06F 15/80* (2006.01)
*G06N 10/00* (2019.01)

(52) U.S. Cl.
CPC ............. *G06F 15/80* (2013.01); *G06N 10/00* (2019.01)

(58) Field of Classification Search
CPC ..... G06F 15/80; G06N 99/002; H04W 99/00; B82Y 10/00
(Continued)

(56) References Cited

U.S. PATENT DOCUMENTS 3,578,968 A    5/1971   Hellwig
8,209,279 B2   6/2012   Freedman et al.
(Continued)

OTHER PUBLICATIONS

Mizushima, "Symmetry-Protected Topological Superfluids and Superconductors", YITP-15-67, Jan. 2016.*
(Continued)

*Primary Examiner* — Vu A Vu
(74) *Attorney, Agent, or Firm* — Klarquist Sparkman, LLP (57) ABSTRACT

Among the embodiments disclosed herein are example methods for generating all Clifford gates for a system of Majorana Tetron qubits (quasiparticle poisoning protected) given the ability to perform certain 4 Majorana zero mode measurements. Also disclosed herein are example designs for scalable quantum computing architectures that enable the methods for generating the Clifford gates, as well as other operations on the states of MZMs. These designs are configured in such a way as to allow the generation of all the Clifford gates with topological protection and non-Clifford gates (e.g. a π/8-phase gate) without topological protection, thereby producing a computationally universal gate set. Several possible realizations of these architectures are disclosed.

19 Claims, 5 Drawing Sheets

Related U.S. Application Data (60) Provisional application No. 62/385,245, filed on Sep. 8, 2016, provisional application No. 62/382,253, filed on Aug. 31, 2016, provisional application No. 62/378,218, filed on Aug. 23, 2016, provisional application No. 62/376,386, filed on Aug. 17, 2016.

(58) Field of Classification Search
USPC .......................................................... 706/52
See application file for complete search history.

(56) References Cited

U.S. PATENT DOCUMENTS

| | | | |
|---|---|---|---|
| 8,583,903 B2 | 11/2013 | Freedman et al. | |
| 8,620,855 B2 | 12/2013 | Bonderson | |
| 9,256,834 B2 | 2/2016 | Bonderson et al. | |
| 2012/0112168 A1 | 5/2012 | Bonderson et al. | |
| 2014/0050475 A1* | 2/2014 | Bonderson | B82Y 10/00 398/45 |
| 2014/0221059 A1* | 8/2014 | Freedman | G06N 99/002 455/899 |
| 2014/0279822 A1 | 9/2014 | Bonderson | |
| 2018/0053113 A1 | 2/2018 | Lutchyn et al. | |
| 2018/0053809 A1 | 2/2018 | Freedman et al. | |

OTHER PUBLICATIONS

Schneiderman, "Quasiparticle Poisoning in a Single Cooper-Pair Box", ResearchGate, DOI: 10.1063/1.2355009, Sep. 2006.*
Aasen et al., "Milestones toward Majorana-based quantum computing," *Phys. Rev. X*, vol. 6, 27 pp. (Apr. 2016).
Alicea et al., "Non-Abelian Statistics and Topological Quantum Information Processing in 1D Wire Networks," *Nature Physics*, 23 pp. (Jun. 2010).
Bolech et al., "Observing Majorana Bound States in p-wave Superconductors Using Noise Measurements in Tunneling Experiments," *Journal of Physical Review Letters*, vol. 98, 4 pp. (Jun. 2007).
Bonderson, "Measurement-Only Topological Quantum Computation via Tunable Interactions," *Phys. Rev. B*, 10 pp. (Jan. 2013).
Bonderson et al., "Quasi-topological phases of matter and topological protection," *Physical Review B*, vol. 87, 27 pp. (Mar. 2013).
Bravyi et al., "Magic state distillation with low overhead," *Physical Review A*, vol. 86, 11 pp. (Sep. 2012).
Bravyi et al., "Universal quantum computation with ideal Clifford gates and noisy ancillas," *Physical Review A*, vol. 71, 15 pp. (Feb. 2005).
Chen et al., "Surface Plasmon Enhanced Sensitive Detection for Possible Signature of Majorana Fermions via a Hybrid Semiconductor Quantum Dot-Metal Nanoparticle System," *Journal of Scientific Reports*, vol. 5, 11 pp. (Aug. 2015).
Deng et al., "Parity independence of the zero-bias conductance peak in a nanowire based topological superconductor-quantum dot hybrid device," *Scientific Reports*, vol. 4, No. 1.

Domanski et al., "Constructive influence of the induced electron pairing on the Kondo state," *Journal of Scientific Reports*, vol. 6, 12 pp. (Mar. 2016).
Gottesman, "Theory of fault-tolerant quantum computation," *Physical Review A*, vol. 57, 30 pp. (Jan. 1998).
Huang et al., "Tunnel spectroscopy of Majorana bound states in topological superconductor-quantum dot Josephson junctions," *Physical Review B, Condensed Matter and Material Physics*, vol. 90, No. 21, 10 pp. (May 2015).
Hyart et al., "Flux-controlled quantum computation with Majorana fermions," *Phys. Rev. B*, vol. 88, 20 pp. (Jul. 2013).
International Search Report and Written Opinion dated Nov. 13, 2017, from International Patent Application No. PCT/US2017/047418, 20 pp.
Karzig et al., "A universal geometric path to a robust Majorana magic gate," *Physical Review X*, vol. 6, 14 pp. (Jul. 2016).
Karzig et al., "Scalable Designs for Quasiparticle-Poisoning-Protected Topological Quantum Computation with Majorana Zero Modes," *Physical Review B*, vol. 95, 32 pp. (Jun. 2017).
Karzig et al., "Scalable Designs for Quasiparticle-Poisoning-Protected Topological Quantum Computation with Majorana Zero Modes," arXiv:1610.05289, 34 pp. (Mar. 2017).
Klinovaja et al., "Electric-Field Induced Majorana Fermions in Armchair Carbon Nanotubes," Journal of Physical Review Letters, vol. 108, 5 pp. (May 2012).
Knill, "Quantum computing with realistically noisy devices," Nature, vol. 434, pp. 39-44 (Mar. 2005).
Landau et al., "Towards Realistic Implementations of a Majorana Surface Code," *Phys. Rev. Letters*, vol. 116, No. 5, 6 pp. (Feb. 2016).
Lee et al., "Electrical manipulation of Majorana fermions in an interdigitated superconductor-ferromagnet device," *Journal of Physical Review Letters*, vol. 109, 5 pp. (Sep. 2012).
Maier et al., "Majorana fermions in Ge/Si hole nanowires," *Journal of Physical Review B*, vol. 90, 11 pp. (Nov. 2014).
Mourik et al., "Signatures of Majorana fermions in hybrid superconductor-semiconductor nanowire devices," *Journal of Science*, vol. 336, No. 6084, 28 pp. (May 2012).
Nijholt et al., "Orbital effect of magnetic field on the Majorana phase diagram," *Physical Review B*, vol. 93, 6 pp. (Jun. 2016).
Pientka et al., "Signatures of topological phase transitions in mesoscopic superconducting rings," *New Journal of Physics*, vol. 15, 14 pp. (Feb. 2013).
Plugge et al., "Roadmap to Majorana surface codes," *Phys. Rev. B*, vol. 94, 23 pp. (Jun. 2016).
Preskill, "Lecture Notes for Ph219/CS219: Quantum Information and Computation—Chapter 5," 56 pp. (Jul. 2015).
Romero Lopes et al., "Algebraic treatment of the Stark effect for hydrogen," Journal of Nuovo Cimento B, vol. 3, Issue 23, 1 pp. (May 1971) (Summary only).
Smirnov, "Nonequilibrium Majorana fluctuations," *Journal of Mesoscale and Nanoscale Physics*, 5 pp. (Aug. 2016).
Vuik et al., "Effects of the electrostatic environment on the Majorana nanowire devices," *New Journal of Physics*, vol. 18, 15 pp. (Mar. 2016).

* cited by examiner

QUANTUM COMPUTING METHODS AND DEVICES FOR MAJORANA TETRON QUBITS

CROSS REFERENCE TO RELATED APPLICATIONS

This application claims the benefit of U.S. Provisional Application No. 62/376,386, entitled "MEASURING AND MANIPULATING MAJORANA QUASIPARTICLE STATES USING THE STARK EFFECT" filed on Aug. 17, 2016, and U.S. Provisional Application No. 62/378,218, entitled "MEASURING AND MANIPULATING STATES OF NON-ABELIAN QUASIPARTICLES VIA QUANTUM DOT HYBRIDIZATION ENERGY SHIFTS" filed on Aug. 23, 2016; U.S. Provisional Application No. 62/382,253, entitled "QUANTUM COMPUTING DEVICES WITH MAJORANA HEXON QUBITS" filed on Aug. 31, 2016, and U.S. Provisional Application No. 62/385,245, entitled "QUANTUM COMPUTING METHODS AND DEVICES FOR MAJORANA QUAD QUBITS" filed on Sep. 8, 2016, all of which are hereby incorporated herein by reference in their entirety.

This application is also a continuation-in-part of U.S. Nonprovisional application Ser. No. 15/634,983, entitled "MEASURING AND MANIPULATING STATES OF NON-ABELIAN QUASIPARTICLES VIA QUANTUM DOT HYBRIDIZATION ENERGY SHIFTS" filed on Jun. 27, 2017, and U.S. Nonprovisional application Ser. No. 15/636,376, entitled "QUANTUM COMPUTING DEVICES WITH MAJORANA HEXON QUBITS" filed on Jun. 28, 2017, which are hereby incorporated herein by reference in their entirety.

FIELD

This application relates generally to quantum computers. More specifically, the application concerns topologically protected quantum circuits.

SUMMARY

Among the embodiments disclosed herein are example methods for generating all Clifford gates for a system of Majorana Tetron qubits (quasiparticle poisoning protected) given the ability to perform certain 4 Majorana zero mode (MZM) measurements. Also disclosed herein are example designs for scalable quantum computing architectures that enable the methods for generating the Clifford gates, as well as other operations on the states of MZMs. These designs are configured in such a way as to allow the generation of all the Clifford gates with topological protection and non-Clifford gates (e.g., a $\pi/8$-phase gate) without topological protection, thereby producing a computationally universal gate set. Several possible realizations of these architectures are disclosed.

The example hardware designs disclosed herein can be scaled to arbitrarily many qubits. Further, in certain embodiments, the hardware designs allow only a specific, restricted set of measurements (restricted both in terms of which measurements are possible and in terms of which pairs of qubits can be measured). The methods for generating Clifford gates disclosed herein enable universality with only these restricted measurements. Among the various aspects of the disclosed methods are one or more of: a change of Pauli frames to avoid performing Hadamards; creation of Y standards with state injection to make S gates; distillation of Y standards if only vertical ZZ and horizontal XX measurements are available; and/or sublattice arrangement of qubits to ensure that ancillas are available as needed (this last aspect is to overcome the restriction on which pairs of qubits can be measured, while the other aspects are to overcome which measurements can be performed). The combination of these techniques has not been considered and changes to the techniques are needed to accommodate all the restrictions; for example, only a limited set of Pauli frame changes are possible in this setting so Y standards are also needed; the Y standards must be implemented using only this restricted set; and only specific distillation protocols can be used due to the restriction on available measurements.

The disclosed methods can be implemented, at least in part, as computer-executable instructions (software) stored on one or more computer-readable media (storage devices or memory devices) and executable by one or more processors. The processors can be classical computer processors that are used as part of the system that controls, monitors, and/or reads out results from a quantum device (e.g., a quantum computer).

DETAILED DESCRIPTION

I. General Considerations

Disclosed herein are representative embodiments of methods, apparatus, and systems for topological quantum devices, and in particular for topologic qubits as can be used in a topological quantum computer. The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used alone or in various combinations and subcombinations with one another. For example, one or more method acts from one embodiment can be used with one or more method acts from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted herein. Typically, a given technique/tool does not solve all such problems.

As used in this application and in the claims, the singular forms "a," "an," and "the" include the plural forms unless the context clearly dictates otherwise. Additionally, the term "includes" means "comprises." Further, as used herein, the term "and/or" means any one item or combination of any items in the phrase.

II. Majorana Tetron Qubit

Systems with MZMs are often referred to as "topological" or "topologically protected," but, more precisely, they are "symmetry protected topological," as detailed in Phys. Rev. B 87, 195451 (2013) [arXiv:1212.6395]. In particular, their topological protection is based on fermion parity symmetry, meaning the system's fermion parity must be preserved in order to manifest topological protection of the states encoded nonlocally in the MZMs. Consequently, MZM systems are potentially vulnerable to stray electrons entering MZMs from outside the system—a quasiparticle poisoning. Such events constitute errors for quantum information encoded in the (nonlocal) fermion parities of MZMs. In particular, they take qubits out of the computational subspace, since they flip the fermion parities associated with the MZMs. Hence, it is desirable to protect MZM systems used for quantum computation from quasiparticle poisoning.

Certain example embodiments disclosed herein are systems that comprise mesoscopic superconducting islands that each host 4 Majorana zero modes (MZMs), a unit that is collectively referred to herein as a "Majorana Tetron qubit" (also known as a 'Majorana Quad qubit"). When the charging energy $E_c$ of a superconducting island is sufficiently large, it provides the contained MZMs protection from quasiparticle poisoning. Four is the smallest number of MZMs that supports a single computational qubit, which is encoded in the nonlocal (topological) state space of the MZMs—the joint fermionic parity of pairs of the MZMs.

This disclosure discloses methods for generating all n-qubit Clifford operations with topological protection, using joint parity measurements of 4 MZMs, two from one Majorana Tetron qubit and two from another.

It has been proposed (as detailed in Preskill's notes: http://www.theory.caltech.edu/preskill/ph219/chap5_15.pdf) that single qubit Clifford gates together with the ability to make an entangling Clifford measurement between adjacent pairs of qubits yields the ability to generate all n-qubit Clifford gates. However, the geometry of practical designs involving MZMs on superconducting islands demands an analysis of which sparse sets of operations suffice to generate all Clifford operation, and how efficiently they can do so.

In particular, exploring possible geometries for MZMs on an island while minding the fact that MZMs are most easily produced at the ends of wires that are parallel to a fixed magnetic field direction (as discussed in Phys. Rev. B 93, 235434 (2016) [arXiv:1509.02675]), one finds that it is not possible to arrange the system such that all local fermion parity measurements of pairs of MZMs can be achieved using planar arrays of quantum dots. Similarly, only certain combinations of 4 MZMs with two from one island and two from another can have their joint parity measured using planar arrays of quantum dots.

Disclosed herein are examples of a general protocol for building up the full Clifford group from 4 MZM measurements and the careful use of ancillary qubits, with specific sets of possible measurements which may be dictated by the mentioned geometric/design constraints.

Also disclosed are two specific device designs involving "linear Majorana Tetron qubits" and "2-Sided Majorana Tetron qubits," respectively, which enable the generation of all Clifford operations. In the case of linear Majorana Tetron qubits, an adequate number of 4 MZM measurements are available to implement all Clifford operations. In the case of 2-Sided Majorana Tetron qubits, fewer 4 MZM operations are available, but there are enough supplementary 2 MZM measurements to nonetheless generate all Clifford gates. In both cases, efficiency is enhanced by exploiting available 2 MZM measurements, which are not strictly necessary for generating the Clifford gates.

The Clifford gates by themselves do not form a computationally universal gate set, but that supplementing the Clifford gates with a non-Clifford 1-qubit gate, e.g. the $\pi/8$-phase gate yields a computationally universal gate set. Such a gate can be produced from "magic states" by using measurements. Magic states can be generated in a number of ways for Majorana systems. The apparatuses used to perform measurements and/or tune couplings of MZMs mentioned in this disclosure can be used to generate magic states. (These magic states will not be topologically protected, so they will likely require some error-correction, e.g. by magic state distillation methods of Phys. Rev. A 71, 022316 (2005) [quant-ph/0403025]; if desired, one can also utilize cancelation schemes, such as those detailed in Phys. Rev. X 6, 31019 (2016)[arXiv:1511.05161] to improve the fidelity of magic state generation, before distillation.) Example methods of generating magic states with the described apparatus include the partial interferometry methods detailed in U.S. Pat. No. 9,256,834: "Quantum Computers Having Partial Interferometric Quantum Gates" and the following discussion of performing measurements of non-Pauli operators. Thus, methods disclosed here, together with other protocols for producing magic states as disclosed herein, result in a design for universal quantum computation.

A. Summary of the Gates

If some of the qubits in a quantum device can be used as ancillas, one only needs a very limited set of operations. As outlined in the "Universal Clifford Operations in Majorana Systems" section below, for a square lattice of qubits, it is enough to reach Clifford universality when having XX, ZZ, XZ, ZX measurements available between vertically adjacent qubits and ZZ measurements available between horizontally adjacent qubits. Together with approximate magic state injection this again leads to a universal quantum computer. One of the principles of the scheme is to use ZZ to define, copy and move an overall Z standard from a single qubit defined as Z=+1. With these Z standards, it is then possible to perform the Hadamard gate and CNOT in the vertical direction. Moreover, it is also possible to create YY measurements, which can then be used to define a Y standard (up to a ± sign). The latter allows one to perform phase gates S in the vertical direction, thus making a vertical column Clifford universal. This, in turn, allows one to conjugate each side of the horizontal ZZ measurements by any single-qubit Clifford operators, making the horizontal direction also Clifford universal. The ambiguity in the ±sign of the Y standard can be checked by preparing approximate magic states.

The scheme becomes more efficient if some Pauli standards are quickly available at a qubit, e.g. via single qubit measurements, without the need of transporting global standards through the square lattice.

It is even possible, although less efficient, to build a Clifford universal computer with only XX measurements in horizontal direction and ZZ measurements in vertical direction, combined with X and Z measurements on any single qubit. This example scheme relies on distilling Y standards prepared by approximate magic states or approximate S gates.

B. 2-Sided Majorana Tetron Qubits

Example embodiments of the 2-sided Majorana Tetron qubit comprise two one-dimensional topological superconductors (1DTSs), e.g. half-shell Al-coated InAs nanowires, that are joined by a superconducting backbone. For purposes of this disclosure, the direction parallel to the 1DTSs will be called the horizontal direction, and the perpendicular direction will be called the vertical direction. (It should be understood that this orientation is by way of example only, as embodiments of the disclosed technology can have different orientations and/or rotations.) The backbone effectively joins the two 1DTSs to a single island. The separate charging energy of the 1DTSs is exponentially suppressed by the number of channels that connect the 1DTSs to the backbone. The typical number of channels in the superconductor of half-shell nanowire realizations can be larger than 1000.

The MZMs reside at the ends of the 1DTSs of length L. The remaining hybridization splitting between MZMs will be exponentially suppressed by $\exp(-L/\xi)$, where $\xi$ is the effective coherence length in the 1DTSs. Note that for a short backbone, L not only controls the hybridization within a 1DTS, but also between MZMs of different 1DTSs, for a sufficiently insulating substrate.

Figure 4:
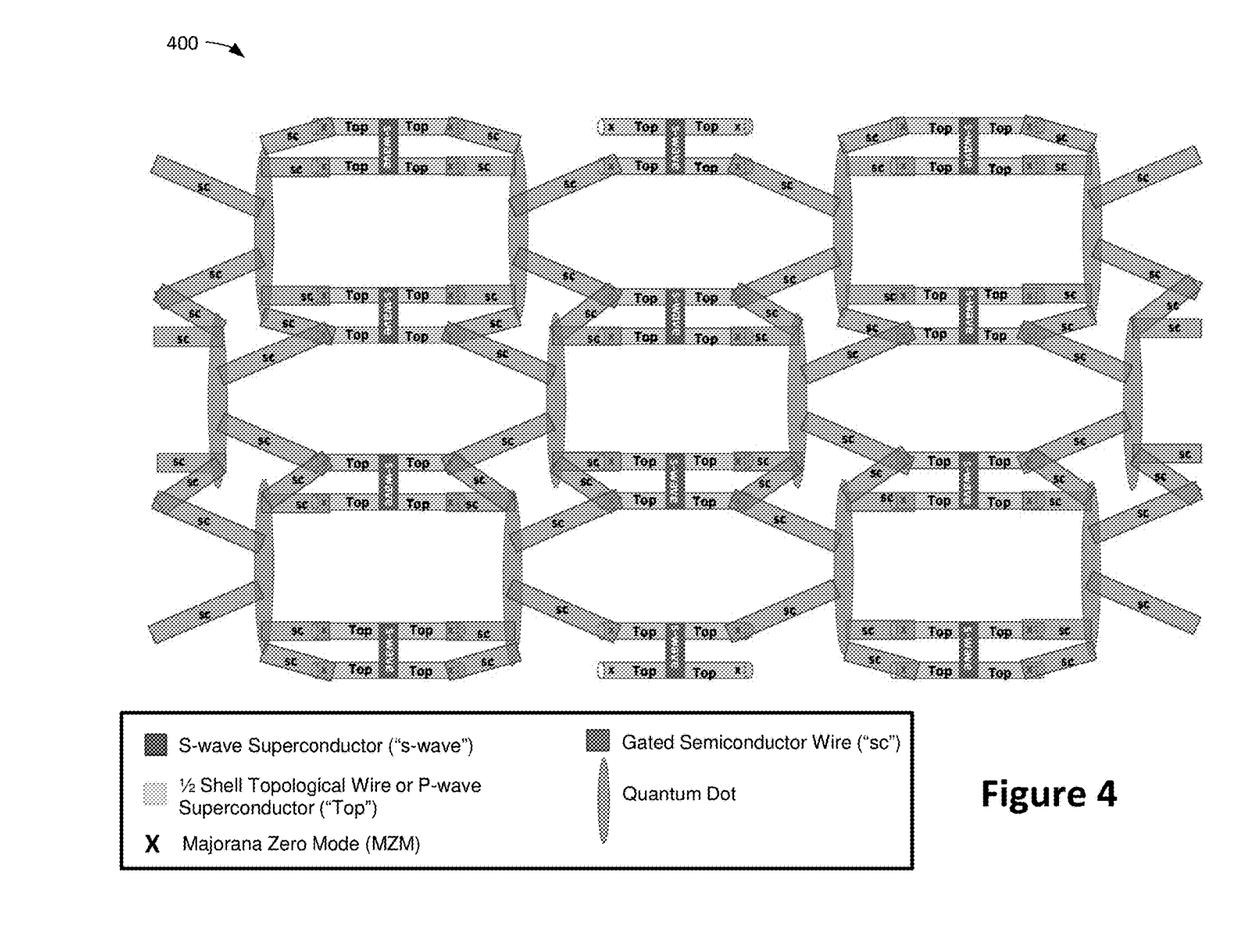
FIG. 4 is a schematic block diagram illustrating an example network of two-sided Majorana Tetron qubits.

To minimize the unwanted hybridization, a 2-sided Majorana Tetron qubit can comprise relatively long 1DTSs that can be spaced closely in the vertical direction. This allows easy access for measurements of pairs of near-by MZMs on each side of the 2-sided Majorana Tetron qubit. In particular examples, a measurement scheme can be used where each of the ends of the 1DTSs is selectively connected to (and disconnected from) semiconducting quantum dots that extend perpendicular to the 1DTSs spanning the distance between two vertically adjacent Majorana Tetron Qubits, as shown in FIG. 4. The connection can be tuned by depletion gates. An additional set of gates can split the quantum dot into separate smaller quantum dots. This setup then allows one to connect the two near-by MZMs on each side of a single 2-side Majorana Tetron qubit to a quantum dot. This enables one to perform a measurement of the parity of the near-by pair of MZMs, which corresponds to a Z measurement of the corresponding qubit. Entangling operations (joint parity measurements) between neighboring qubits (e.g., in the vertical direction) can be performed by coupling one MZM of the upper Majorana Tetron qubit and one MZM of the lower Majorana Tetron qubit to a left dot, while also coupling one MZM of the upper Majorana Tetron qubit and one MZM of the lower Majorana Tetron qubit to the right dot. The measurement is then performed by using the quantum dots as input and output for conductance measurements or directly probing the energy levels of the quantum dots.

Labeling the MZMs within a given Majorana Tetron qubit 1-4 from upper left to lower right, it is possible to entangle MZMs 3 and 4 of the upper Majorana Tetron qubit with MZMs 1 and 2 of the lower one, which corresponds to a XX measurement. Moreover, it is also possible to entangle MZMs 1 and 4 of the upper Majorana Tetron qubit with MZMs 3 and 2 of the lower one, which corresponds to a YY measurement; MZMs 3 and 4 of the upper Majorana Tetron qubit with MZMs 3 and 2 of the lower one, which corresponds to a XY measurement; and MZMs 1 and 4 of the upper Majorana Tetron qubit with MZMs 1 and 2 of the lower one, which corresponds to a YX measurement. In the horizontal direction, it is only possible to entangle MZMs 2 and 4 of a left Majorana Tetron qubit with MZMs 1 and 3 of a right Majorana Tetron qubit, which corresponds to a ZZ measurement.

In summary, the 2-sided Majorana Tetron qubit design (at least) allows for any one or more (e.g., all) of the following measurements:

single qubit: Z
vertical entangling: XX, XY, YX, YY
horizontal entangling: ZZ

With the results discussed in the "Universal Clifford Operations in Majorana Systems" section below, the above gate set is also Clifford universal (the same arguments hold, the analogy becomes explicit when rotating, e.g. Y→Z). It is however less efficient than the case of the linear Majorana Tetron qubit that is discussed in the next section. Due to the absence of some single qubit projections, either the X or Y standard needs to be defined using a reference qubit and applying XX or YY to distribute and copy that standard through the vertical column.

C. Linear Majorana Tetron Qubits

Example embodiments of the linear Majorana Tetron qubit comprise a relatively long 1DTS (of length L), which is partitioned into two topological superconducting regions that are separated by one normal (s-wave) superconducting region. The normal superconducting region can be created from a long 1DTS by gating. Since gating does not affect the superconducting part, there is still a superconducting backbone present that connects the two topological superconducting regions, effectively forming a one-dimensional island. (In a realization of half-shell wires, the superconducting backbone would be the superconducting shell that is present throughout the entire half shell wire of length L.) In order for the Majorana states at the end of the topological superconducting regions to be zero modes, the topological superconducting regions as well as the normal superconducting regions should be sufficiently long compared to the respective coherence lengths in these regions, e.g., $L_{top} \gg \xi_{top}$ and $L_{normal} \gg \xi_{normal}$.

Figure 1:
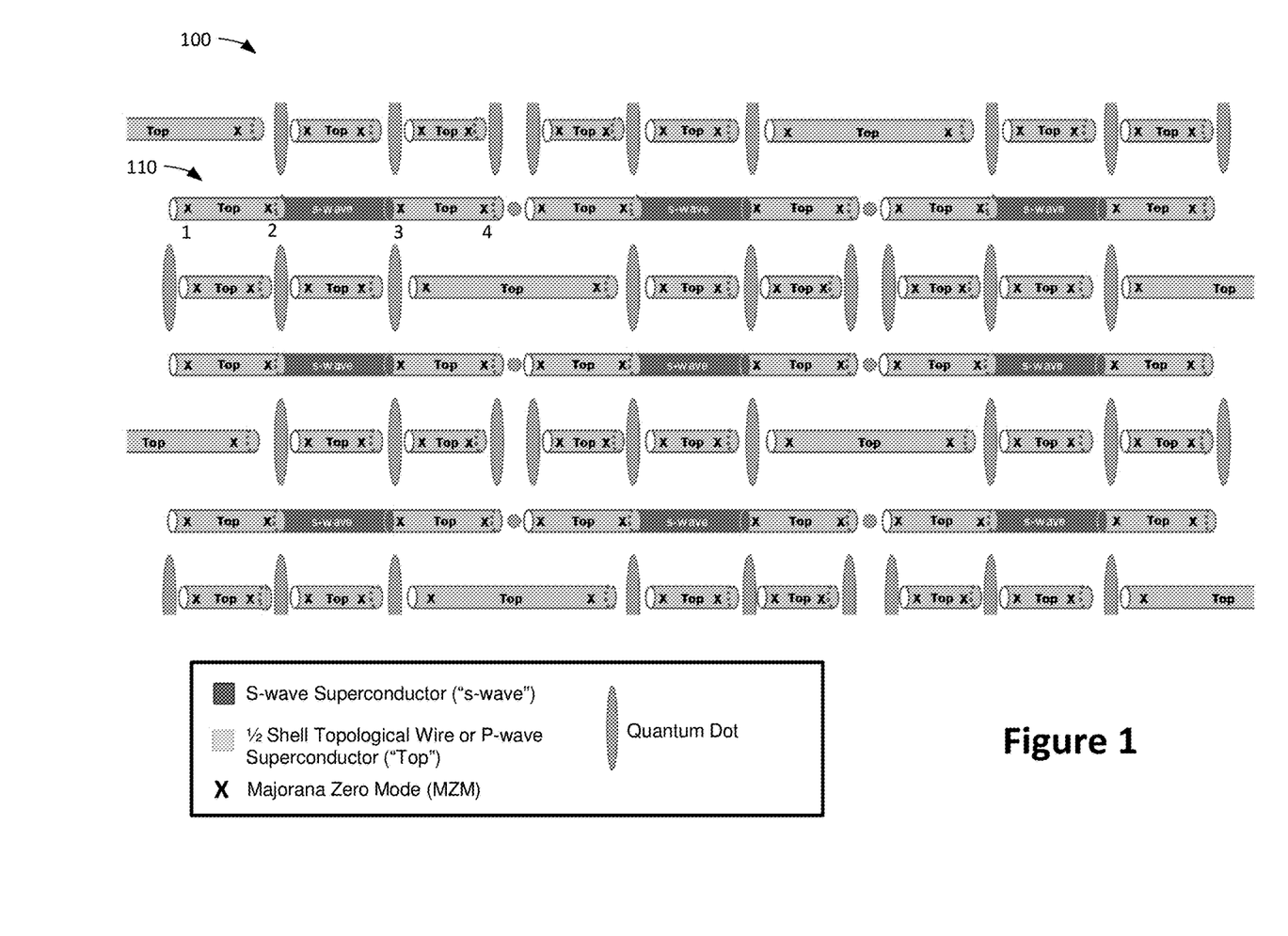
FIG. 1 is a schematic block diagram of an example linear Majorana Tetron qubit device.
Figure 2:
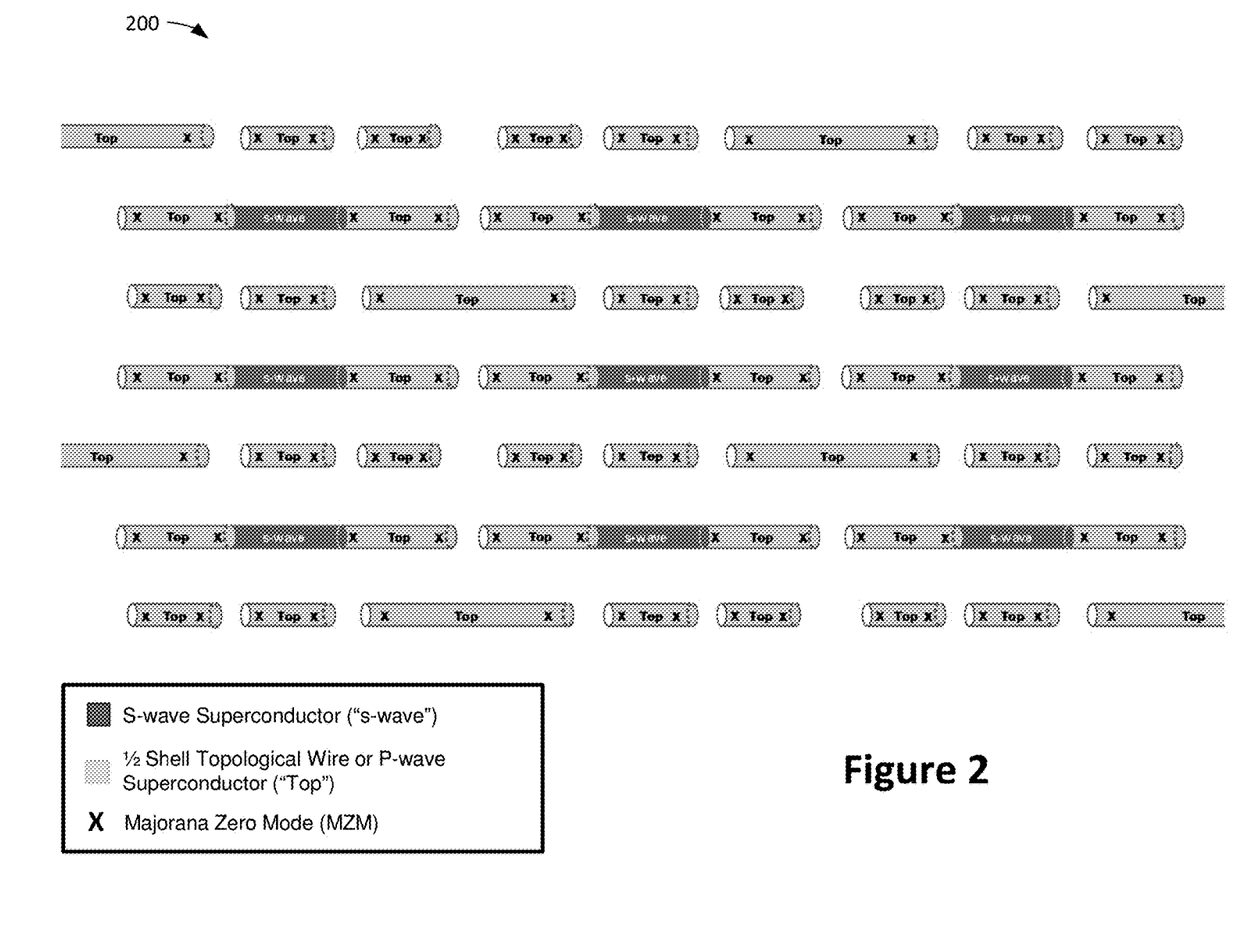
FIG. 2 is a schematic block diagram illustrating example fabrication steps for linear Majorana Tetron qubit device.
Figure 3:
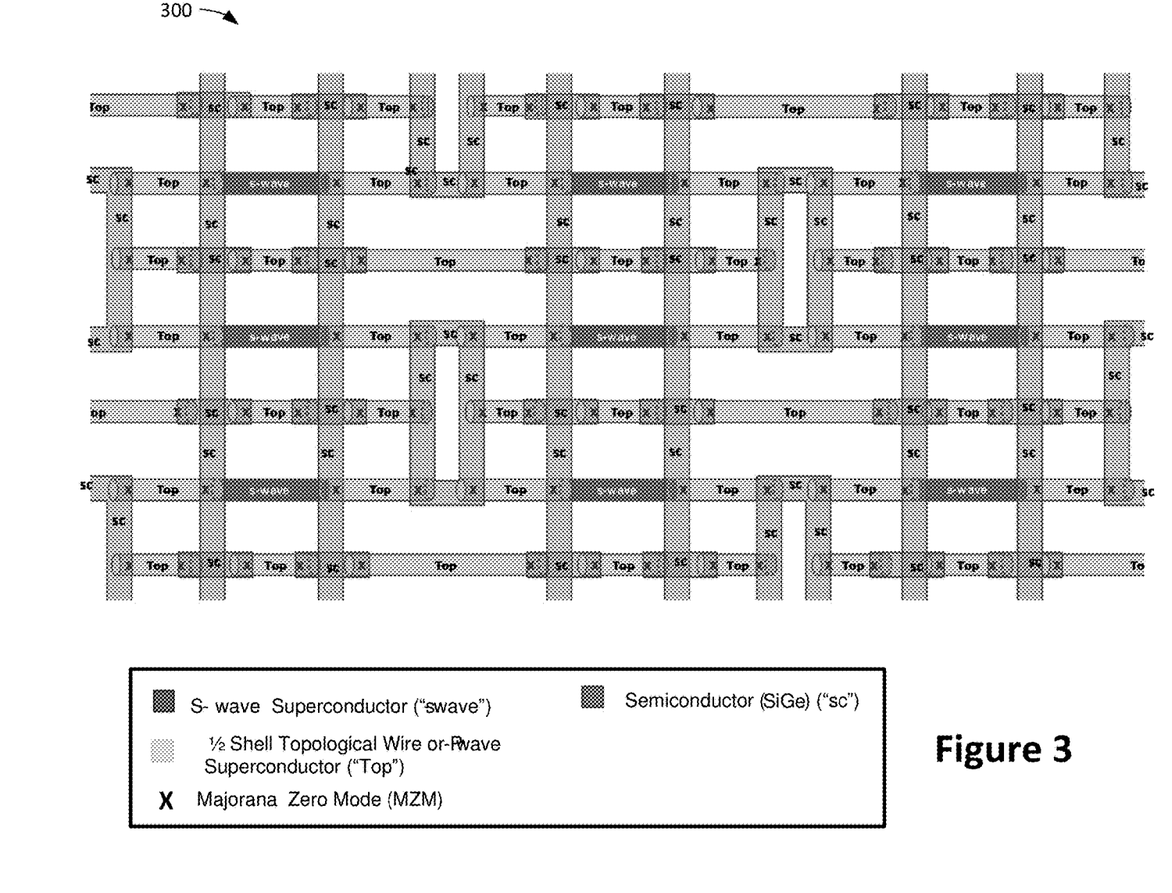
FIG. 3 is a schematic block diagram illustrating example fabrication steps for linear Majorana Tetron qubit device.

Due to the linear layout of the design, there are no pairs of MZMs that are not separated by at least $L_{top}$ or $L_{normal}$. In this sense, measurements cannot be performed by coupling near-by MZMs. Instead, measurements can be performed using reference arms of sufficient length. One possible device design (see FIG. 1) uses reference arms of length $L_{top}$, $L_{normal}$, and $L_{top} + L_{normal}$, which together allow measurements of the following pairs of MZMs (with MZMs of a given linear Majorana Tetron qubit (such as example Majorana Tetron qubit 110) labeled 1-4 from left to right):

(1,2), (1,3), (2,3), and (3,4)). These operations allow for X, Y, and Z measurements of the qubit.

Additionally, this design enables the following 4 MZM measurements between two vertically adjacent linear Majorana Tetron qubits (two MZMs from each qubit). MZMs 3 and 4 of one qubit can be entangled with MZMs 3 and 4 of the other qubit, enabling a ZZ measurement on the pair of qubits. MZMs 3 and 4 of one qubit can be entangled with MZMs 2 and 4 of the other qubit, enabling a ZY measurement. MZMs 2 and 3 of one qubit can be entangled with MZMs 2 and 3 of the other qubit, enabling a XX measurement on the pair of qubits. MZMs 2 and 3 of one qubit can be entangled with MZMs 2 and 4 of the other qubit, enabling a XY measurement on the pair of qubits. MZMs 2 and 4 of one qubit can be entangled with MZMs 2 and 4 of the other qubit, enabling a YY measurement on the pair of qubits.

In the horizontal direction, using at most a single reference arm of length $2L_{top}$, one can perform a 4 MZM measurement between two horizontally adjacent linear Majorana Tetron qubits, as MZMs 3 and 4 of the left qubit can be entangled with MZMs 1 and 2 of the right qubit, enabling a ZZ measurement on the pair of qubits. Using multiple reference arms, the horizontal direction allows for all entangling Pauli-Pauli measurements. In particular implementations, the design of FIG. 1 does not include additional reference arms, but the read out electrons pass through a chain of multiple reference arms (e.g., up to 5 for an XX measurement) in the course of the measurement. The latter would lead to a reduced visibility of the measurement.

In summary, the linear Majorana Tetron qubit designs allow (at least) for any one or more (e.g., all) of the following measurements:
   single qubit: X, Y, Z
   vertical entangling: ZZ, ZY, YZ, XX, XY, YX, YY
   horizontal entangling: at least ZZ With the results discussed in the "Universal Clifford Operations in Majorana Systems" section below, the example device design described herein is therefore efficient in creating Clifford universality, since all Pauli standards and a large number of entangling gates are readily available (note that every second qubit still needs to be an ancilla to perform CNOT gates).

III. Quantum Computing Device Design Considerations

Several designs for assembling the two types of Majorana Tetron qubits into scalable quantum computing devices have been disclosed herein and illustrated in the accompanying figures. As explained, the architectures of tetrons are topological qubits composed of four MZMs. Four is the smallest number of MZMs for which a sector of fixed total fermion parity supports a qubit, e.g., a two-dimensional Hilbert space. The absence of the extra ancillary pair of MZMs that are present in hexon designs results in two notable differences. The first is that one has only two main tetron designs; the tetron analog of the one-sided hexon design cannot be scaled into a two-dimensional array, as each qubit can only connect to its vertically adjacent neighbors. The second difference is that one is not able to generate topologically protected single qubit Clifford gates via operations acting on only one tetron. Instead, the Clifford gates are generated either by joint parity measurements on a pair of tetron qubits or by "Pauli frame changes." In the following section, it is shown how the various designs disclosed herein can be used to perform the desired gates using a limited set of measurements

1. Quantum Information Basics

Consider a system of qubits arranged in a plane in a square lattice, with each qubit labeled by its integer horizontal and vertical coordinates in the lattice. Assume that one has the ability to make a limited set of measurements that are called the elementary operations: between any pair of qubits j and k separated by a displacement $(0, \pm1)$, one can make measurements of the operators $Y_jY_k$, $Z_jZ_k$, $X_jX_k$, $X_jZ_k$, and $Z_jX_k$; between any pair of qubits j and k separated by a displacement $(\pm1, 0)$, one can make measurements of either the operator $Z_jZ_k$ or $Y_jY_k$ (either one suffices). Assume also that one can make single qubit measurements of the operators $X_j$, $Y_k$, and $Z_l$.

Here, it is explained how this set of measurements provides a Clifford-complete set of operations for this system, up to Pauli frame changes. Subsequently, it is explained how a smaller set of measurements may generate Clifford completeness by creating "standards," which removes the need for the single qubit measurements and the vertical $Y_jY_k$ measurements. In a final reduction, it is shown that Clifford completeness may be attained even if the only available operations are vertical $X_jX_k$ measurements and horizontal $Z_jZ_k$ measurements. In the basic architectures utilizing these methods, the qubits are broken into a "checkerboard" arrangement, using one color as data qubits and one as ancillary qubits. That is, a qubit is designated as a data qubit when the sum of its coordinates is even, and as an ancillary qubit when the sum of its coordinates is odd.

Pauli Frame Changes—

Pauli frame changes (see, e.g., E. Knill, Quantum computing with realistically noisy devices, Nature (London) 434, 39 (2005)) refers to the idea of not performing certain single qubit Clifford gates such as X, Z, and H in a quantum circuit, but instead modifying subsequent measurements accordingly. The idea is that, given a sequence composed of single qubit operators X, Z, and H, and single-qubit Pauli measurements, one can classically track the total single qubit operation and perform the appropriately conjugated measurements. Thus, for a sequence such as: measure $Z_jZ_k$, apply $H_k$, measure $Z_kZ_l$, apply $X_k$, and measure $Z_jZ_k$, one can commute the operators X and H through the measurements by appropriately changing what measurements one performs. Using $Z_kZ_jH_k=H_kX_kZ_l$ and $Z_jZ_kX_kH_k=-X_kH_kZ_jX_k$, one finds that this sequence of operations is equivalent to the sequence: measure $Z_jZ_k$, measure $X_kZ_l$, measure $-Z_jX_k$, and apply $X_kH_k$. The final single qubit Clifford gates do not need to be performed if they follow all measurements in the circuit.

One can also commute the single qubit Clifford gates through CNOT gates. Since magic state injection is performed using CNOT gates, single qubit Clifford gates are not necessary even when the circuit includes T gates, where $$T \equiv \begin{pmatrix} 1 & 0 \\ 0 & e^{i\pi/4} \end{pmatrix}. \tag{1}$$

The effect of Pauli frame changes is to permute the set of two-qubit measurements. This may change the set of available measurements if the set of elementary operations does not include all two-qubit measurements. For this reason, Pauli frame changes are avoided that correspond to commuting the Clifford phase gate $$S \equiv \begin{pmatrix} 1 & 0 \\ 0 & i \end{pmatrix} \quad (2)$$

through other operations. This allows the set of available vertical measurements needed to remain fixed throughout the computation.

As specific operations are described that are built out of the elementary measurements, it will sometimes be said that one can perform an operation "up to $\{X, Z, H\}$" or "up to $\{X, Z\}$," describing the possible frame change on the qubits. The particular frame change that is implemented is determined by the measurement outcomes. An operation up to $\{X, Z\}$ may map $Z \rightarrow \pm Z$ and $X \rightarrow \pm X$ (with the mapping on Y determined by the mapping of X and Z). An operation up to $\{X, Z, H\}$ may additionally map $Z \rightarrow \pm X$ and $X \rightarrow \pm Z$.

Vertical Teleportation—

Using measurements $X_k X_l$ and $Z_k Z_l$ between a pair of qubits with displacement $(0, \pm 1)$, one can create an EPR pair of the qubits k and l. A further pair of measurements $X_j X_k$ and $Z_j Z_k$ will teleport the state of qubit j to qubit l. This teleportation is up to $\{X, Z\}$ on qubit l.

Vertical CNOT and Swap—

One can also apply a CNOT gate, up to $\{X, Z\}$, on two qubits separated by $(0, \pm 2)$, e.g., two data qubits separated vertically by one ancillary qubit in between them. For this, one can use the left circuit of FIG. 5, where the control, ancillary, and target qubits are labeled C, A, and T, respectively.

Figure 5:
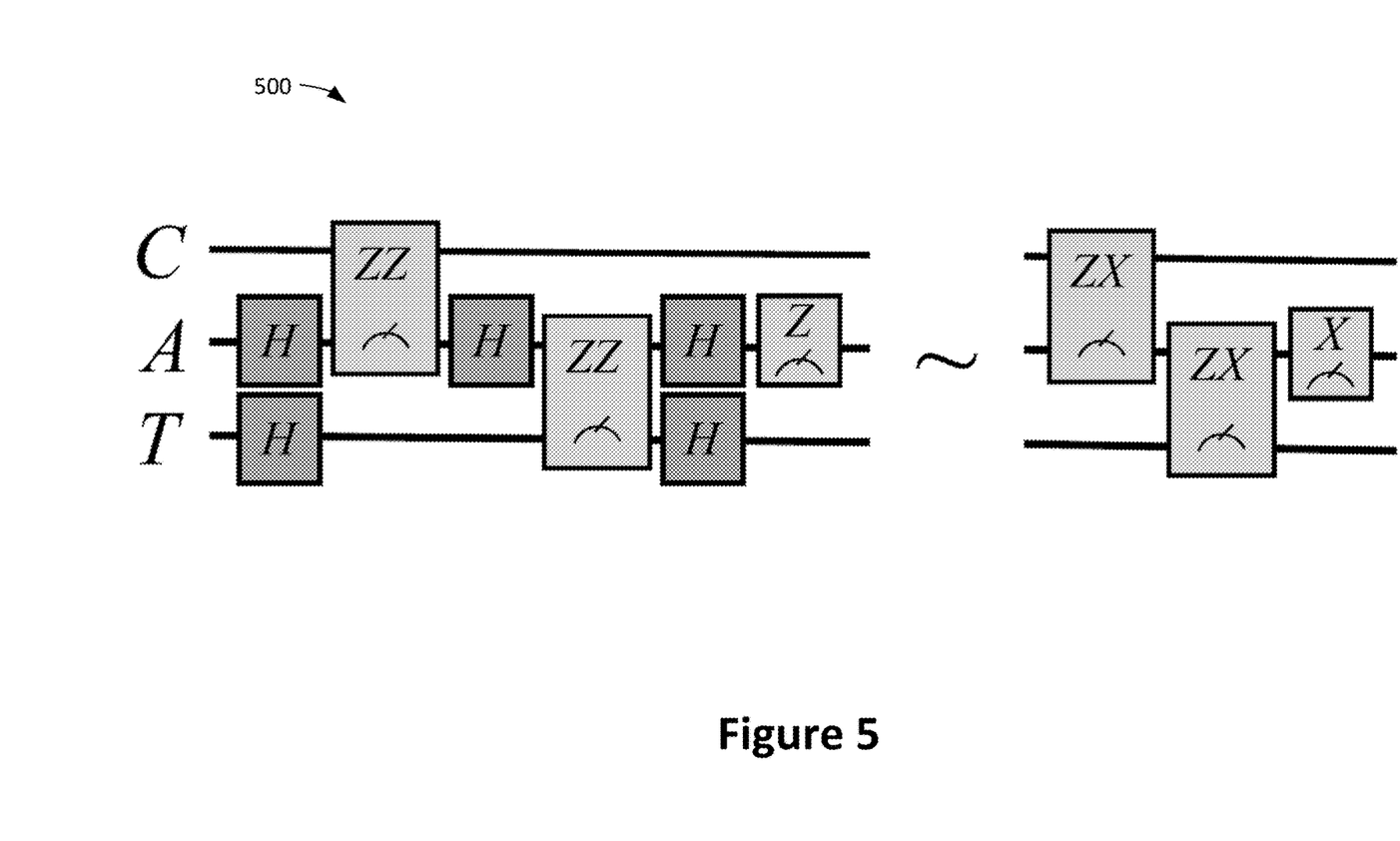
FIG. 5 is a schematic block diagram of an exampled controlled NOT circuit.

More specifically, FIG. 5 shows two equivalent circuits implementing the CNOT gate. As noted, the control, ancillary, and target qubits are labeled C, A, and T, respectively. Gates labeled H are Hadamard gates, the other boxes correspond to one and two qubit measurements as indicated by the corresponding Pauli operators. The left circuit implements a CNOT up to $\{X, Z\}$ on qubits C and T. As explained herein, the Hadamard operators can be commuted through to yield the simplified circuit shown on the right, up to $\{X, Z, H\}$.

Qubit A is initialized in an eigenstate of Z. One takes qubits C and T to be on the even sublattice, separated in the vertical direction with A the ancillary qubit in between them. This circuit gives a CNOT up to $\{X, Z\}$ on qubits C and T.

The Hadamard operators in this circuit can be commuted through the measurements to the end of the circuit, resulting in the CNOT gate up to $\{X, Z, H\}$. The resulting sequence of operations in the simplified circuit is: measure $Z_C X_A$, measure $Z_A X_T$, and measure $X_A$.

The ability to perform CNOT gates in both directions on a pair of qubits allows one to Swap the pair of qubits (through the application of three alternating CNOT gates). This allows arbitrary motion of the data qubits in the vertical direction.

Hadamard Gate without Pauli Frame Change and Single Qubit X Measurement—

The method of Pauli frame changes above is an efficient method to implement a single qubit Clifford gate, as no actual operations need to be performed on the qubits. However, switching between different Pauli frames may change the set of available operations. The Hadamard gate does not affect the set of available operations in the vertical direction. Thus, if one only considers vertical measurements, one can perform Hadamard gates by frame changes.

However, suppose that one wishes to perform a Hadamard gate followed by a measurement of $Z_j Z_k$ of qubits separated by $(\pm 1, 0)$. In this case, the new frame requires a measurement of $Z_j X_k$, which is not an elementary operation for those qubits.

In order to overcome this, it will be shown how to perform a Hadamard gate while only utilizing Pauli frame changes that are up to $\{X, Z\}$, as such Pauli frame changes will leave the set of available horizontal operations unchanged. Let $\mathrm{Swap}_{jk}$ swap qubits j and k. Consider the operation $$U = \mathrm{Swap}_{jl} H_l \mathrm{Swap}_{jl} H_l, \quad (3)$$

for a pair of data qubits j and l that are separated by $(0, \pm 2)$ (vertically nearest-neighbor data qubits with one ancillary qubit in between them). An implementation of $\mathrm{Swap}_{jl}$ is up to $\{X, Z\}$. Since $H_l$ appears twice in this operation, the net frame change in performing U is still up to $\{X, Z\}$; that is, it will not interchange $X_k \leftrightarrow Z_k$. As an operator, $U = H_j H_l$ applies the Hadamard gate to each of the two qubits.

An alternative way to implement a Hadamard gate is to use the following variant of the vertical teleportation protocol. Use measurements $X_k Z_l$ and $Z_k X_l$ between a pair of qubits separated by $(0, \pm 1)$, e.g., one data qubit and one ancillary qubit, to create an EPR pair up to the Hadamard gate on l. Then measure $X_j X_k$ and $Z_j Z_k$ to teleport the state of qubit j to qubit l while performing a Hadamard on the encoded state. Since teleportation may be used to route qubits, this allows the Hadamard gate to be performed "for free" at the same time as a teleportation.

Horizontal CNOT and Swap—

Using the method described above to generate a Hadamard gate without frame change, the horizontal measurements of $Z_j Z_k$ can be conjugated to become measurements of $Z_j X_k$ or $X_j X_k$. One can thereby obtain a CNOT gate acting on a pair of qubits separated by $(\pm 2, 0)$ by using only $Z_j Z_k$ measurements horizontally. If instead one has only $Y_j Y_k$ measurements horizontally, one can use an S gate (an implementation of which is explained below) to conjugate them to become measurements of $X_j X_k$. Since a Swap is generated from three alternating CNOT gates, one now has the ability to perform horizontal Swaps of second nearest neighbor pairs of qubits, using the intermediate qubit as an ancillary qubit to facilitate the operation.

S Gate—

An S gate can be implemented without frame change by utilizing state injection of a +1 eigenstate of Y. Such a state can be produced by measuring a single qubit Y operator.

Note that instead of implementing a standard state injection using unitary gates (e.g., a CNOT gate), a measurement-based injection is more tailored for the architectures disclosed herein. In particular, a shorter circuit for implementing an S gate (up to Z gates on the source) is given by the sequence of operations: prepare an ancillary qubit in the +1 eigenstate of Y, measure the operator ZX, where Z is on the data qubit and X is on the ancillary qubit, and then measure Z on the ancillary qubit.

$Y_j Y_k$ Measurement—

One can measure $Y_j Y_k$ between any pair of qubits j and k that are separated by $(0, \pm 2)$ using only the other elementary operations, through the following sequence: apply a CNOT gate from j to k, apply a Hadamard gate on qubit j, apply a CNOT gate from j to k, measure $Z_k$, apply a CNOT gate from j to k, apply a Hadamard gate on qubit j, and apply a CNOT gate from j to k. One may verify that the result of this sequence of operations is equal to a measurement of $-Y_j Y_k$.

Living without Single-Qubit Measurements: Using "Standards"—

If it is not possible to perform single-qubit measurements, but only two-qubit measurements, it is still possible to generate a Clifford complete set of operations. By measuring $X_j X_k$, $Y_j Y_k$, or $Z_j Z_k$, a qubit state that is an eigenvector of X, Y, or Z can be copied indefinitely. Such a qubit is referred to as a "standard."

To achieve Clifford completeness without single-qubit measurements, one can store standards in every data qubit with odd horizontal coordinate. The data qubits now have coordinates (2n, 2m) in the lattice, for n, m∈ℤ (there are now three ancillary qubits per data qubit). With this arrangement, one can perform single qubit measurements on qubits with even horizontal coordinate. In fact, which eigenstate of X, Y, or Z one chooses for the standard is arbitrary, as the choice has no effect on measurements, when restricting to Clifford operations. If magic state injection is performed, the choice of eigenstate used for the Y standard becomes important. In this case, magic state injection can be used to identify the choice of Y standard (see, e.g., J. Preskill, Lecture notes for physics 219: quantum computation, 2004).

Restricted Two-Qubit Operations—

Now suppose that one can measure $X_j$ or $Z_j$ on any single qubit, but one can only perform the limited set of two-qubit measurements: $Z_j Z_k$ between a pair of vertically-separated qubits and $X_j X_k$ between a pair of horizontally-separated qubits. This is still sufficient to build a universal quantum computer if one can produce an approximate magic state. While this is not likely to be a practical architecture and all architectures described herein have more than this set of measurements, it is interesting that this restricted set of operations remains universal. The following discussion of operations will be up to {X, Z}.

Using the same circuit shown in FIG. 5, one can perform a CNOT between two qubits separated by a displacement (±1, ±1). For example, to generate a CNOT gate with the (0, 0) qubit as the control and the (1, 1) qubit as the target, one can use the following sequence: prepare the ancillary qubit A in an X eigenstate, measure $Z_C Z_A$, and measure $X_A X_T$. Given the ability to perform CNOT gates, one can perform Swap. In the above example, the (1, 1) qubit is a standard. Applying multiple Swap operations allows the data qubits to move arbitrarily within the data qubit sublattice while leaving the standards intact.

However, one does not yet have the ability to perform the full Pauli group with this restricted set, since one does not have the ability to perform the Hadamard gate. These gates cannot be implemented through Pauli frame changes as one has a smaller set of elementary operations. Suppose, however, that one could produce many Y standards, either Y=+1 or Y=−1 eigenstates. Using this Y standard and state injection, one can perform an S gate. Once an S gate is available, one can also measure $Y_j X_k$, $X_j Y_k$, and $Y_j Y_k$ between any two horizontally separated qubits. Thus, one has the ability to perform all the elementary operations described at the beginning of this section, but with Y and Z operators interchanged and horizontal and vertical directions interchanged. One therefore has operations that are Clifford complete up to {X, Z}.

If one can produce approximate Y standards, one can distill them using methods similar to, but simpler than the methods of S. Bravyi and J. Haah, Magic state distillation with low overhead, Phys. Rev. A 86, 052329 (2012). For this, one can use any CSS code that allows transversal S gates, such as the 7-qubit code from D. Gottesman, Theory of fault-tolerant quantum computation, Phys. Rev. A 57, 127 (1998). Using a CSS code allows one to check the stabilizers of the code using only CNOT gates and measurement and preparation of qubits in Z and X eigenstates. It should be noted that one can generate Y standards, for example, if one can generate an approximate S gate. Of course, if one can generate approximate T gates, then one can produce approximate $S=T^2$ gates. Similarly, if one can produce approximate magic states, one can use them to produce approximate Y standards.

IV. Further Representative Embodiments

This section describes various example representative embodiments of the disclosed technology. These embodiments should not be construed as limiting, as they can be modified in arrangement and detail without departing from the principles of the disclosed technology.

For instance, one example embodiment as described herein is a two-sided Majorana Tetron qubit, comprising: two topological superconducting nanowires, each of the topological superconducting nanowires having a respective first end at which a respective first Majorana zero mode resides and a respective second end, opposite the first respective end, where a respective second Majorana zero mode resides; and a superconducting backbone element connected to the two topological superconducting nanowires, the superconducting backbone element being located between the respective first ends and the respective second ends of the two topological superconductive nanowires.

In some example implementations, the superconducting backbone element is oriented transverse to the two topological superconducting nanowires. In further implementations, the two topological superconducting nanowires are half-shell topological wires or p-wave superconductors, and the superconducting backbone element is an s-wave superconductor. In certain implementations, the two topological superconducting nanowires are located on a superconducting island having a charging energy sufficient to prevent quasiparticle poisoning.

Further embodiments include a network that further comprises multiple instances of the two-sided Majorana Tetron qubit as described above. In example implementations of such embodiments, one or more neighboring instances of the linear Majorana Tetron qubit are selectively coupled to one another by one or more semiconductive wires having tunable depletion gates configured to provide quantum-dot couplings between the neighboring instances. Further, the one or more neighboring instances of the two-sided Majorana Tetron qubit are neighboring along a horizontal direction, a vertical direction, or both. Any of these embodiments can include couplings as shown in FIG. 4 and/or to allow the measurements of 4 Majorana modes as described in the Universal Clifford Operations in Majorana Systems section.

Another embodiment as disclosed herein is a method comprising generating Clifford operations from measurements of four Majorana zero modes. In such embodiments, the Clifford operations can comprise all Clifford operations so as to provide a computationally universal gate set for a quantum device or quantum computer once augmented by an additional approximate rotation. In particular implementations, the four Majorana zero modes measured are resident in any of the two-sided Majorana Tetron qubits or networks as described above.

A further example embodiment as described herein is a linear Majorana Tetron qubit, comprising a topological superconducting nanowire partitioned into regions, including: two MZM topological superconducting regions, each having a respective first end at which a respective first Majorana zero mode resides and a respective second end, opposite the first respective end, where a respective second Majorana zero mode resides; and an s-wave superconducting region that separates the two MZM topological superconducting regions from one another.

In certain example implementations, the s-wave superconducting region is created by gating junctions between the two MZM topological superconducting regions and the s-wave superconducting region. In some examples, the topological superconducting nanowire is located on a superconducting island having a charging energy sufficient to prevent quasiparticle poisoning.

Further embodiments include a network that further comprises two or more instances of any of the linear Majorana Tetron qubits as described above. In some implementations, one or more neighboring instances of the linear Majorana Tetron qubit are selectively coupled to one another by semiconductive wires having tunable depletion gates configured to provide quantum-dot couplings between the neighboring instances. In certain implementations, the one or more neighboring instances of the linear Majorana Tetron qubit are neighboring along a horizontal direction, a vertical direction, or both. Some example networks further comprise one or more intermediate topological superconducting nanowires interposed between the two or more instances of the linear Majorana Tetron qubit, each of the one or more intermediate topological superconducting nanowires having a respective first end at which a respective first Majorana zero mode resides and a respective second end, opposite the first respective end, where a respective second Majorana zero mode resides. In some examples, the intermediate topological superconducting nanowires are coupled to the semiconductive wires.

Also disclosed herein are example methods for generating Clifford operations from measurements of four Majorana zero modes, wherein the four Majorana zero modes measured are resident in any of the linear Majorana Tetron qubits or networks as described above. In certain embodiments, the Clifford operations comprise all Clifford operations so as to provide a computationally universal gate set for a quantum device or quantum computer once augmented by an additional approximate rotation.

More generally, this application discloses example methods to produce an approximate rotation of a single qubit.

V. Concluding Remarks

Further examples and details concerning the disclosed technology, as well as other architectures with which the disclosed technology can be used, are described in T. Karzig et al., "Scalable Designs for Quasiparticle-Poisoning-Protected Topological Quantum Computation with Majorana Zero Modes," arXiv:1610.05289 (March 2017) and T. Karzig et al., "Scalable Designs for Quasiparticle-Poisoning-Protected Topological Quantum Computation with Majorana Zero Modes," Phys. Rev. B 95, 235305 (2017), both of which are hereby incorporated herein by reference.

Having described and illustrated the principles of the disclosed technology with reference to the illustrated embodiments, it will be recognized that the illustrated embodiments can be modified in arrangement and detail without departing from such principles. In view of the many possible embodiments to which the principles of the disclosed invention may be applied, it should be recognized that the illustrated embodiments are only preferred examples of the invention and should not be taken as limiting the scope of the invention.

What is claimed is:

1. A quantum computing device, comprising:
    a two-sided Majorana Tetron qubit, comprising:
        two topological superconducting nanowires, each of the topological superconducting nanowires having a respective first end at which a respective first Majorana zero mode resides and a respective second end, opposite the first respective end, where a respective second Majorana zero mode resides; and
        a superconducting backbone element connected to the two topological superconducting nanowires,
        the superconducting backbone element being located between the respective first ends and the respective second ends of the two topological superconductive nanowires.

2. The quantum computing device of claim 1, wherein the superconducting backbone element is oriented transverse to the two topological superconducting nanowires.

3. The quantum computing device of claim 1, wherein the two topological superconducting nanowires are half-shell topological wires or p-wave superconductors.

4. The quantum computing device of claim 1, wherein the superconducting backbone element is an s-wave superconductor.

5. The quantum computing device of claim 1, wherein the two topological superconducting nanowires are located on a superconducting island having a charging energy sufficient to prevent quasiparticle poisoning.

6. A network comprising multiple instances of the quantum computing device of claim 1.

7. The network of claim 6, wherein two or more neighboring instances of the Majorana Tetron qubit are selectively coupled to one another by one or more semiconductive wires having tunable depletion gates configured to provide quantum-dot couplings between the neighboring instances.

8. The network of claim 7, wherein the two or more neighboring instances of the two-sided Majorana Tetron qubit are neighboring along a horizontal direction, a vertical direction, or both.

9. A method comprising:
    generating Clifford operations in a quantum computer from measurements of four Majorana zero modes,
    wherein the Clifford operations comprise all Clifford operations so as to provide a computationally universal gate set for a quantum device or quantum computer once augmented by an additional rotation, and
    wherein the four Majorana zero modes measured are resident in the two-sided Majorana Tetron qubit of claim 1.

10. A system, comprising:
    a linear Majorana Tetron qubit, comprising:
        a topological superconducting nanowire partitioned into regions, including:
        two MZM topological superconducting regions, each having a respective first end at which a respective first Majorana zero mode resides and a respective second end, opposite the first respective end, where a respective second Majorana zero mode resides; and
        an s-wave superconducting region that separates the two MZM topological superconducting regions from one another.

11. The system of claim 10, wherein the s-wave superconducting region is created by gating junctions between the two MZM topological superconducting regions and the s-wave superconducting region.

12. The system of claim 10, wherein the topological superconducting nanowire is located on a superconducting island having a charging energy sufficient to prevent quasi-particle poisoning.

13. A network comprising two or more instances of the system of claim 10.

14. The system of claim 13, wherein one or more neighboring instances of the linear Majorana Tetron qubit are selectively coupled to one another by semiconductive wires having tunable depletion gates configured to provide quantum-dot couplings between the neighboring instances.

15. The system of claim 14, wherein the one or more neighboring instances of the linear Majorana Tetron qubit are neighboring along a horizontal direction, a vertical direction, or both.

16. The system of claim 14, further comprising one or more intermediate topological superconducting nanowires interposed between the two or more instances of the linear Majorana Tetron qubit, each of the one or more intermediate topological superconducting nanowires having a respective first end at which a respective first Majorana zero mode resides and a respective second end, opposite the first respective end, where a respective second Majorana zero mode resides.

17. The system of claim 14, wherein the intermediate topological superconducting nanowires are coupled to the semiconductive wires.

18. A method comprising:
generating Clifford operations from measurements of four Majorana zero modes, wherein the four Majorana zero modes measured are resident in the of claim 10.

19. The method of claim 18, wherein the Clifford operations comprise all Clifford operations so as to provide a computationally universal gate set for a quantum device or quantum computer once augmented by an additional approximate rotation.

* * * * *